(12) United States Patent
Kim et al.

(10) Patent No.: US 10,825,065 B2
(45) Date of Patent: Nov. 3, 2020

(54) SYSTEM AND METHOD FOR BILLING OF ORDER CALL RELAY

(71) Applicant: WOOWA BROTHERS CO., LTD., Seoul (KR)

(72) Inventors: Bong Jin Kim, Seoul (KR); Soo Kwon Kim, Seongnam-si (KR)

(73) Assignee: WOOWA BROTHERS CO., LTD., Seoul (KR)

( * ) Notice: Subject to any disclaimer, the term of this patent is extended or adjusted under 35 U.S.C. 154(b) by 246 days.

(21) Appl. No.: 15/588,564

(22) Filed: May 5, 2017

(65) Prior Publication Data

US 2017/0243264 A1  Aug. 24, 2017

Related U.S. Application Data

(63) Continuation-in-part of application No. PCT/KR2015/011772, filed on Nov. 4, 2015.

(30) Foreign Application Priority Data

Nov. 5, 2014  (KR) .......................... 10-2014-0152609

(51) Int. Cl.
*G06Q 40/00* (2012.01)
*G06Q 30/04* (2012.01)
(Continued)

(52) U.S. Cl.
CPC .............. *G06Q 30/04* (2013.01); *G06Q 20/14* (2013.01); *G06Q 20/305* (2013.01); *G06Q 30/0603* (2013.01)

(58) Field of Classification Search
CPC combination set(s) only.
See application file for complete search history.

(56) References Cited

U.S. PATENT DOCUMENTS 7,024,373 B1 * 4/2006 Reynolds ............... G06Q 20/12
705/1.1
2002/0065714 A1 * 5/2002 Goodwin, III ..... G06Q 30/0237
705/14.25
(Continued)

FOREIGN PATENT DOCUMENTS

JP   H11-308348 A   11/1999
JP   2007-068080 A   3/2007
(Continued)

OTHER PUBLICATIONS

Hoffman, Donna (How to Acquire Customers on the Web, Harvard Business Review Home, https://hbr.org/2000/05/how-to-acquire-customers-on-the-web, May 2000) (Year: 2000).*
(Continued)

*Primary Examiner* — Sarah M Monfeldt
*Assistant Examiner* — Mark H Gaw
(74) *Attorney, Agent, or Firm* — Knobbe Martens Olson & Bear LLP (57) ABSTRACT

Disclosed are a system and a method capable of pricing/billing a relay commission for a delivery order in a delivery order relay system which relays delivery orders, requested by users by phone call, to a store. One aspect of the present invention provides a system for billing relay of an order call, for billing a relay commission regarding an order through phone call, comprising: an order success determination module for determining whether a phone order placed by phone call is successfully received when the phone call is connected from a user terminal to a target store; and a billing module for billing a relay commission regarding the phone order to the target store when it is determined that the phone order is successfully received.

5 Claims, 8 Drawing Sheets

(51) Int. Cl.
*G06Q 20/14* (2012.01)
*G06Q 20/30* (2012.01)
*G06Q 30/06* (2012.01)

(56) References Cited

U.S. PATENT DOCUMENTS

| | | | |
|---|---|---|---|
| 2003/0126032 A1* | 7/2003 | Coode | G06Q 30/0635 |
| | | | 705/26.35 |
| 2006/0069586 A1 | 3/2006 | Sutcliffe | |
| 2007/0007331 A1* | 1/2007 | Jasper | G07F 7/00 |
| | | | 235/379 |
| 2008/0081617 A1* | 4/2008 | Yoo | H04W 8/28 |
| | | | 455/433 |
| 2010/0191666 A1* | 7/2010 | Trott | G06Q 40/06 |
| | | | 705/36 R |

FOREIGN PATENT DOCUMENTS

| | | |
|---|---|---|
| JP | 2010-049378 A | 3/2010 |
| KR | 10-2008-0044606 A | 5/2008 |
| KR | 10-2009-0001451 A | 1/2009 |
| KR | 10-2011-0003992 A | 1/2011 |
| KR | 10-2013-0065744 A | 6/2013 |
| KR | 2013-0065744 A | 6/2013 |
| KR | 10-2013-0097905 A | 9/2013 |
| KR | 10-2015-0145791 A | 12/2015 |

OTHER PUBLICATIONS

International Search Report dated Feb. 25, 2016 of PCT/KR2015/011772 which is the parent application and its English translation—5 pages.

Office Action of corresponding Japanese Patent Application No. 2017-523918—3 pages (dated May 18, 2018).

* cited by examiner

<Delivery business establishment C>
Select menu

☐ Menu 1 : Price : 4,000   Quantity : [   ]
☑ Menu 2 : Price : 5,000   Quantity : [ 2 ]
☐ Menu 3 : Price : 7,000   Quantity : [   ]
☑ Menu 4 : Price : 4,500   Quantity : [ 2 ]

Payment amount
: 19,000 KRW     [Telephone order]   [App order]

SYSTEM AND METHOD FOR BILLING OF ORDER CALL RELAY

BACKGROUND

Field

The present disclosure relates to an order call relay billing system and method, and more specifically, to a system and method for enabling a delivery order relay system which relays a delivery order requested by a user through a call to the business establishment side to set/bill a relay commission for the delivery order.

Description of Related Art

In order to make orders for a delivery service, such as food delivery, a process of checking a list of orderable products through flyers or a webpage provided by a corresponding business establishment, selecting one of the orderable products, and ordering the selected product by making a phone call to the corresponding business establishment is performed. However, to select a desired product through the above process with respect to many delivery business establishments takes a lot of time and efforts. Accordingly, there is recently emerging a service for establishing a member relation with a plurality of delivery business establishments, arranging a plurality of menus provided by the delivery business establishments manifestly for each business establishment, and providing the menus.

Furthermore, relay services which relay delivery orders are emerging. Such an order relay service is managed in such a manner that it provides information about a plurality of delivery business establishments to a user, and when the user selects one of the delivery business establishments and requests a delivery order through an order relay service, the delivery order is relayed to the delivery business establishment corresponding to the corresponding delivery order, and a relay commission according to the relay of the order is paid by the corresponding delivery business establishment.

The disclosure of this section is to provide background of the invention. Applicant notes that this section may contain information available before this application. However, by providing this section, Applicant does not admit that any information contained in this section constitutes prior art.

SUMMARY

Figure 1A:
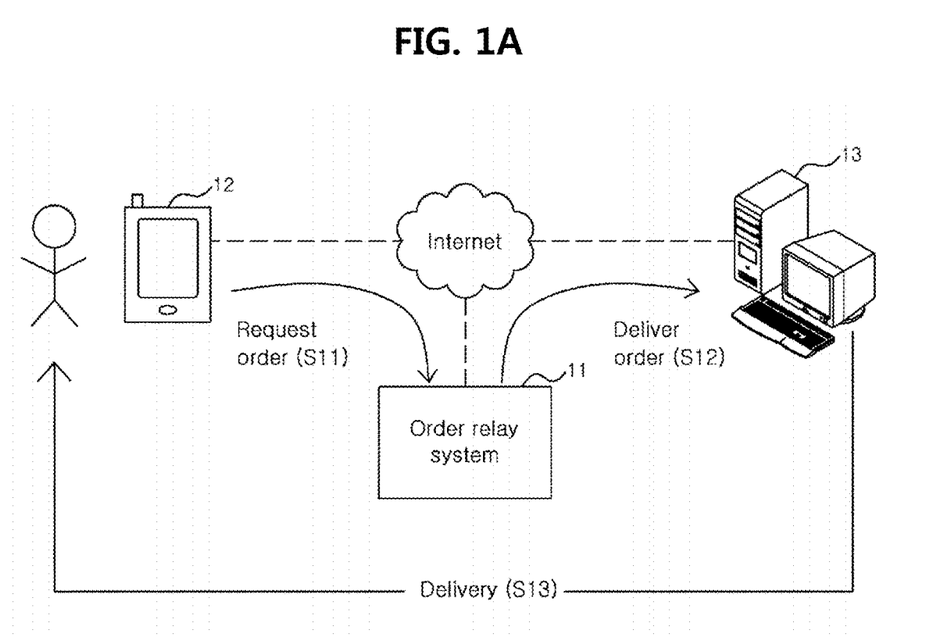
FIG. 1a is a diagram for illustrating a conventional order relay method over a data communication network.
Figure 1B:
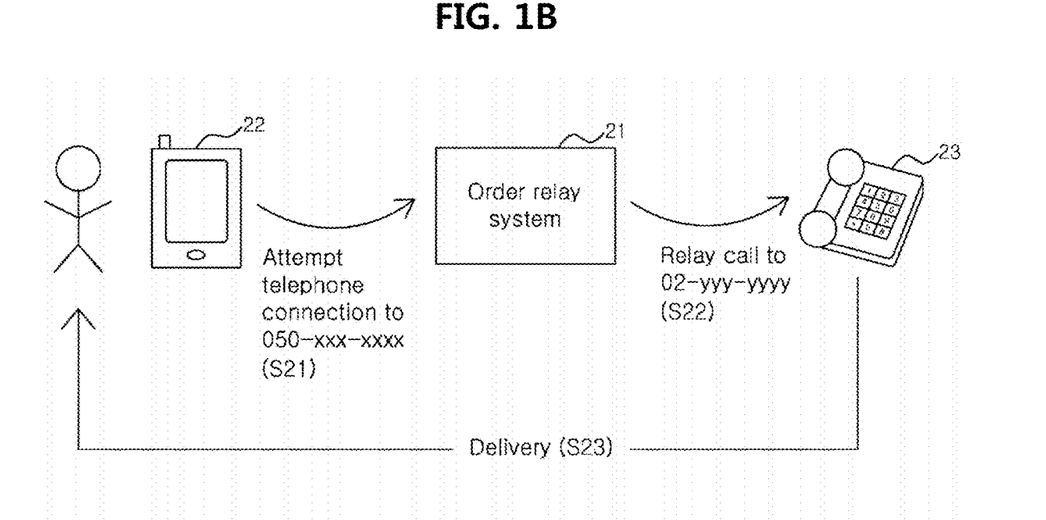
FIG. 1b is a diagram for illustrating a conventional order relay method over a telephone network.

An order relay system may be divided into a relay method over a data communication network, such as that shown in FIG. 1A, and a relay method over a telephone network, such as that shown in FIG. 1B.

In the relay method over a data communication network, such as that shown in FIG. 1A, all of an order relay system 11, a user terminal 12 and a business establishment terminal 13 may be connected over a data communication network (e.g., the Internet). Meanwhile, as shown in FIG. 1A, a user specifies a delivery article, a delivery place address, etc. using the user terminal 12 and requests a delivery order from the order relay system 11 (S11). The order relay system 11 that has received the request for the delivery order may transfer (i.e., relay) the delivery order to a corresponding business establishment terminal 13 (S12). In response thereto, the delivery business establishment may deliver the delivery article to the user (S13).

Meanwhile, in a relay method over a data communication network, the user selects a business establishment and a menu using an order application (e.g., an application "Baedal's Minjok by Woowa Brothers Inc., etc.) installed on his or her user terminal 12, and requests a delivery order from the order relay system 11 over a data communication network. The user may also pay for the order through the order application. In this case, the order relay system may use a billing method for setting a specific percentage of the payment price of each relay order as a relay commission and levying the relay commission on a business establishment because the order relay system can obtain information about the payment price of each relayed order from the order application.

Meanwhile, in the relay method over a telephone network, such as that shown in FIG. 1B, a virtual telephone number mapped to the actual telephone number of each business establishment may be assigned to the corresponding business establishment, and a user may be provided with the virtual telephone number (e.g., a 050 number) other than the actual telephone number of the business establishment. If the user attempts a telephone call to the virtual telephone number using his or her terminal 22 (S21), the telephone call is connected to an order relay system 21. The order relay system 21 relays the telephone call to the actual telephone number of the business establishment corresponding to the virtual telephone number, so the telephone call can be connected between the user terminal 22 and a business establishment telephone 23 (S22). Thereafter, the business establishment may receive the contents of an order from the user through the connected telephone call, and may deliver a delivery article according to the contents of the order to the user (S23).

Meanwhile, in the relay method over a telephone network, the order relay system 21 cannot be aware whether the order through the phone call in addition to the contents of the order between the user and the business establishment has been successfully received or not. Accordingly, in the relay method over a telephone network, only a method for setting a relay commission based on the number of relayed telephone calls or billing a flat-rate fee may be used.

An aspect of the present invention is to provide a system and method, which enable a relay commission to be set and billed by incorporating whether a telephone order is successful or not and/or the detailed contents of an order in an order relay method over a telephone network.

In accordance with an aspect of the present invention, as an order call relay billing system for charging a relay commission on an order through a telephone call, there is provided the order call relay billing system, including an order success determination module which determines whether the receipt of a telephone order through a telephone call has been successful when a user terminal connects the telephone call to a target business establishment and a billing module which charges a relay commission on the telephone order for the target business establishment if it is determined that the receipt of the telephone order has been successful.

In one embodiment, the order success determination module may determine that the receipt of the telephone order through the telephone call has been successful if the period of the call of the telephone call is a specific reference period or more.

In one embodiment, the telephone call may be a relay call relayed by the order call relay billing system or a relay system operating in conjunction with the order call relay billing system. The order success determination module may determine that the receipt of the telephone order through the telephone call has been successful if the period of the call of the relay call is the reference period or more.

In one embodiment, the order call relay billing system may further include a price information determination module which determines information about the price of an ordered article requested through the telephone order and a commission determination module which determines the relay commission for the telephone order based on the information about the price of the ordered article.

In one embodiment, the price information determination module may determine payment price information transmitted by the user terminal to be the information about the price of the ordered article.

In one embodiment, the user terminal may obtain the payment price information through an order application installed on the user terminal and send the obtained payment price information to the order call relay billing system. The order application may be an application which requests a delivery order from an order relay system operating in conjunction with the order call relay billing system over a data communication network and pays a price for the delivery order to the order relay system. The order relay system may be a system which relays the delivery order requested over the data communication network to a delivery business establishment corresponding to the delivery order.

In one embodiment, the price information determination module may obtain information about an average price of delivery articles to be delivered by the target business establishment from an order relay system operating in conjunction with the order call relay billing system, and may determine the information about the price of the ordered article requested through the telephone order based on information about an average price of items provided by the target business establishment. The order relay system may be a system which relays a delivery order for the target business establishment, requested by a connector terminal connected to the order relay system over a data communication network, to the target business establishment, which counts the price data of ordered articles requested through the delivery order relayed to the target business establishment, and which calculates an average price of delivery articles to be delivered by the target business establishment based on the counted data.

In one embodiment, the billing module may add the relay commission for the telephone order to the amount asked during the term to be asked with respect to the target business establishment during the term if the receipt of the telephone order through the telephone call is determined to have been successful, and may calculate the final amount asked during the term by applying a specific discount rate to the amount asked during the term.

In accordance with another aspect of the present invention, as an order call relay billing system for charging a relay commission on an order through a telephone call, there is provided the order call relay billing system, including a price information determination module which determines information about the price of an ordered article by a telephone order through a telephone call when a user terminal connects the telephone call to a target business establishment, a commission determination module which determines a relay commission for the telephone order based on the information about the price of the ordered article by the telephone order, and a billing module which charges the relay commission on the telephone order for the target business establishment.

In accordance with another aspect of the present invention, as an order call relay billing method for charging a relay commission on an order through a telephone call, there is provided the order call relay billing method, including the steps of (a) determining, by an order call relay billing system, whether the receipt of a telephone order through a telephone call has been successful when a user terminal connects the telephone call to a target business establishment and (b) charging, by the order call relay billing system, a relay commission on the telephone order for the target business establishment if it is determined that the receipt of the telephone order has been successful.

In one embodiment, the step (a) may include the step (a') of determining that the receipt of the telephone order through the telephone call has been successful if the period of the call of the telephone call is a specific reference period or more.

In one embodiment, the telephone call may be a relay call relayed by the order call relay billing system or a relay system operating in conjunction with the order call relay billing system. The step (a') may include the step of determining that the receipt of the telephone order through the telephone call has been successful if the period of the call of the relay call is the reference period or more.

In one embodiment, the order call relay billing method may further include the steps of (c) determining, by the order call relay billing system, information about the price of an ordered article requested through the telephone order and (d) determining, by the order call relay billing system, the relay commission for the telephone order based on the information about the price of the ordered article.

In one embodiment, the step (c) may include the step of determining payment price information transmitted by the user terminal to be the information about the price of the ordered article.

In one embodiment, the user terminal may obtain the payment price information through an order application installed on the user terminal and sends the obtained payment price information to the order call relay billing system. The order application may be an application which requests a delivery order from an order relay system operating in conjunction with the order call relay billing system over a data communication network and pays a price for the delivery order to the order relay system. The order relay system may be a system which relays the delivery order requested over the data communication network to a delivery business establishment corresponding to the delivery order.

In one embodiment, the step (c) may include the step of obtaining information about an average price of delivery articles to be delivered by the target business establishment from an order relay system operating in conjunction with the order call relay billing system and of determining the information about the price of the ordered article requested through the telephone order based on information about an average price of items provided by the target business establishment. The order relay system may be a system which relays a delivery order for the target business establishment, requested by a connector terminal connected to the order relay system over a data communication network, to the target business establishment, which counts the price data of ordered articles requested through the delivery order relayed to the target business establishment, and which calculates an average price of delivery articles to be delivered by the target business establishment based on the counted data.

In one embodiment, the step (b) may include the steps of adding the relay commission for the telephone order to the amount asked during the term to be asked with respect to the target business establishment during the term if the receipt of the telephone order through the telephone call is determined to have been successful and of calculating the final amount asked during the term by applying a specific discount rate to the amount asked during the term.

In accordance with another aspect of the present invention, as an order call relay billing method for charging a relay commission on an order through a telephone call, there is provided the order call relay billing method, including the steps of determining, by an order call relay billing system, information about the price of an ordered article by a telephone order through a telephone call when a user terminal connects the telephone call to a target business establishment, determining, by the order call relay billing system, a relay commission for the telephone order based on the information about the price of the ordered article by the telephone order, and charging, by the order call relay billing system, the relay commission on the telephone order for the target business establishment.

In accordance with another aspect of the present invention, there is provided a computer-readable recording medium on which a program which performs the aforementioned method has been recorded.

In accordance with another aspect of the present invention, as an order call relay billing system, there is provided the order call relay billing system including a processor and memory for storing a computer program executed by the processor, wherein the computer program enables the order call relay billing system to perform the aforementioned method when the computer program is executed by the processor.

In accordance with an embodiment of the present invention, there can be provided a technical spirit in which even in the case of a telephone order the contents of which are difficult to check, whether the receipt of a telephone order has been successful or not and/or the price of an ordered article requested through a telephone order can be predicted and a relay commission can be calculated based on the prediction of whether the receipt of the telephone order has been successful or not and/or the predicted price. Accordingly, there is an advantage in that illogicalness felt by a business establishment if a relay commission is one-sidedly set by not taking into consideration whether a telephone order is successful or not or the price of an ordered article can be reduced.

Meanwhile, whether the receipt of a telephone order has been successful or not and/or the price of an ordered article requested through a telephone order, which has been determined by the order call relay system according to an embodiment of the present invention, may be a little inaccurate because it is predicted based on reference data. Accordingly, another embodiment of the present invention may provide a technical spirit in which illogicalness which may be felt by a business establishment when a relay commission is levied based on inaccurate prediction data can be reduced by applying a discount rate to a set relay commission.

BRIEF DESCRIPTION OF THE DRAWINGS

A brief description of each drawing is provided in order to more fully understand the drawings cited in the detailed description of the present invention.

DETAILED DESCRIPTION OF EMBODIMENTS

Embodiments of the invention will now be described with reference to the accompanying drawings. The terminology used in the description presented herein is not intended to be interpreted in any limited or restrictive manner, simply because it is being utilized in conjunction with a detailed description of certain specific embodiments of the invention.

An aspect of the present invention provides a system and method for determining service fee (commission) of order made via a voice call between a user and a delivery service. A user activates a smartphone application installed on her smartphone 400 for making an order for a delivery service provided by a delivery restaurant 500. The smartphone application provides menus of the delivery restaurant 500 to the user. When the user selects at least one item on the smartphone application and makes a delivery order by confirming the selected item using a user interface of the smartphone application without having a telephone call with the delivery restaurant 500. Then, the smartphone application generates and transmits a delivery request to a remote computing system 100. The remote computing system 100 stores details of the delivery request in a data store connected to the remote computing system. The remote computing system 100 then transmits a request for fulfilling the user order to a computing terminal 520 at the delivery restaurant 500. When the delivery order has been fulfilled, the remote computing system 100 receives a confirmation of fulfilled order and updates order logs in the data store. Using logs of fulfilled orders stored in the data store, the remote computing system 100 determines service fees (commission) for the fulfilled orders.

While the smartphone application provides the user interface (1$^{st}$ user interface) for placing an order, the smartphone application provides about user interface (2$^{nd}$ interface) to make a telephone call to the delivery restaurant. When the user selects the second interface for making a telephone call to the delivery restaurant 500, the smartphone application generates and transmits a request for establishing a voice call session (between the smartphone 400 and a pre-registered telephone 510 of the delivery restaurant) to a call relay system 200. The call relay system 200 then establishes a voice call between the smartphone 400 and the telephone 510 (or a mobile phone of the delivery service provider). The call relay system 200 collects and records details of the established voice call in a data store connected to the call relay system. In some embodiments, on receiving user input on the second interface to make a voice call, the smartphone application causes the smartphone 400 to make a telephone call directly to the telephone 510 of the delivery restaurant without involving the call relay system 200. In such cases, the smart phone application collects and records details of the established voice call. In embodiments, the details of the established voice call include at least one of identification (e.g., telephone number) of the smartphone, identification of the user, telephone number of the telephone 510, identification of the circuit delivery restaurant 520, duration of the voice call, and user input made on the smartphone 400 during the voice call. In embodiments, the smartphone application and/or the call relay system 200 transmit details of the established voice calls to the remote computing system 100. In embodiments, the smartphone application and/or the call relay system 200 store details of the established voice call in a data store connected to the remote computing system 100.

When a user places an order via a voice call (telephone call) to a delivery restaurant using the second interface of the smartphone application, the content of the voice call is not available to the smartphone application or the remote computing system (billing system). Therefore, to determine a service fee (commission) for the established voice call initiated via on the second interface of the smartphone application, the remote computing system (in cooperation with the smartphone application, the call relay system) determines or estimates (1) whether an order has been placed via the voice call and (2) what is the price for the placed order using available details (using the details of previously established voice calls).

In embodiments, the billing system 100 estimated that a delivery order was been placed when the voice call was longer than a predetermined reference time. In embodiments, the billing system 100 estimates that a delivery order was placed when voice calls when at least two consecutive calls are made between the smartphone and the restaurant (during a predetermined time period).

In embodiments, the billing system 100 estimates the price for the placed order (which is a factor of the commission) using information of one or more previous orders ("App order") placed for the same delivery restaurant via the first user interface of the smartphone. As prices of the App orders (placed via the first user interface) are available to the billing system 100, the billing system 100 estimates the estimates the price for the placed order (voice call order) using the prices of the App orders (App orders made for the same restaurant, App orders from other users that can be related to the user based on at least one from age, address, pattern of order and a preferred restaurant). In some embodiments, a minimum price of the previous orders (via the first interface, without a voice call) may be used as a factor of the commission. In some embodiments, among the previous orders (App orders), the billing system 100 considers the App orders made during a predetermined length of time period (days, weeks, months) before the voice call, made during the same week(s), the same months(s), or same hour(s) of the day to which the voice call belongs to for determining the price of the voice call order.

The present invention may be modified in various ways and may be implemented to have several embodiments. Specific embodiments are illustrated in the drawings and are described in detail. It is however to be understood that the present invention is not intended to be limited to the specific embodiments and the present invention includes all modifications, equivalents and substitutions which fall within the spirit and technological scope of the present invention. In describing the present invention, a detailed description of a known art related to the present invention will be omitted if it is deemed to make the gist of the present invention unnecessarily vague.

Terms, such as the first and the second, may be used to describe various elements, but the elements should not be restricted by the terms. The terms are used to only distinguish one element from the other element.

The terms used in this application are used to only describe specific embodiments and are not intended to restrict the present invention. An expression of the singular number includes an expression of the plural number unless clearly defined otherwise in the context.

In this specification, terms, such as "include" or "have", are intended to designate that characteristics, numbers, steps, operations, elements, or parts which are described in the specification, or a combination of them exist, and should not be understood that they exclude the existence or possible addition of one or more other characteristics, numbers, steps, operations, elements, parts or combinations of them in advance.

Furthermore, in this specification, if any one element "transmits" data to the other element, this means that the element may directly transmit the data to the other element or may transmit the data to the other element through at least another element. In contrast, if any one element "directly transmits" data to the other element, this means that the data is transmitted from the element to the other element without the intervention of another element.

Figure 2:
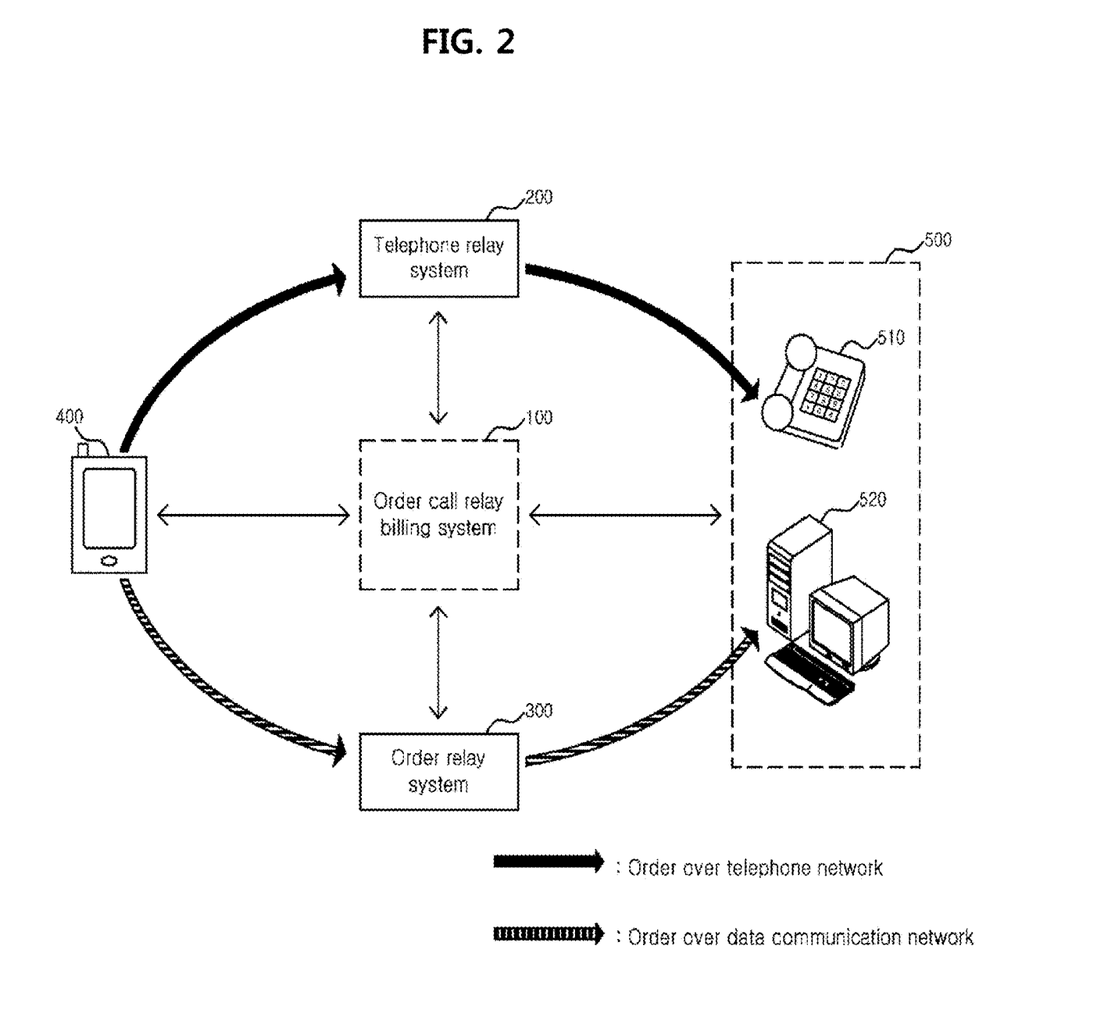
FIG. 2 is a diagram for illustrating an environment in which an order call relay billing system according to an embodiment of the present invention operates.

FIG. 2 is a diagram for illustrating an environment in which an order call relay billing system according to an embodiment of the present invention operates.

Referring to FIG. 2, in order for an order call relay billing method according to the technical spirit of the present invention to be performed, the order call relay billing system 100 may be provided.

A user terminal 400 may connect a telephone call to the telephone 510 of a business establishment through a telephone conversation and request an order through a voice or an ARS. The order may preferably be a delivery order that requests a delivery article to be delivered to a user.

Meanwhile, in one embodiment, the user terminal 400 may connect the telephone call to the telephone 510 of the business establishment through a telephone relay system 200 operating in conjunction with the order call relay billing system 100. In this case, a virtual telephone number mapped to the actual telephone number of the business establishment 500 may be assigned to the telephone 510 of the business establishment 500. The telephone relay system 200 may have stored a mapping relation between the actual telephone number and virtual telephone number of the business establishment 500. Furthermore, the user terminal 400 may be provided with the virtual telephone number of the business establishment 500. In the present embodiment, the user terminal 400 may attempt a call to the virtual telephone number of the business establishment 500 in order to place an order to the business establishment 500. Accordingly, the call is connected to the telephone relay system 200. The telephone relay system 200 relays the telephone call to the actual telephone number of the business establishment 500 mapped to the virtual telephone number, so the telephone call may be connected between the user terminal 200 and the telephone 510 of the business establishment 500.

Meanwhile, the order call relay billing system 100 may be a system for levying a relay commission for the order through the telephone call on the business establishment 500 that has received the order through the telephone call. The order call relay billing system 100 may determine the relay commission for the telephone order by predicting whether the receipt of the telephone order through the telephone call connected between the user terminal 400 and the telephone 510 of the business establishment 500 has been successful or not and/or the price of an ordered article requested through the telephone order, and may levy the relay commission on the business establishment 500.

In some implementation examples, an order relay system 300 may send or receive information and/or data from the user terminal 400, if necessary.

Meanwhile, the order call relay billing system 100 may operate in conjunction with the telephone relay system 200 and/or a specific order relay system 300. In this specification, what two systems operate in conjunction with each other may mean that in a narrow sense, the two systems are managed by the same business establishment or a business establishment having a specific contract relation with the two systems, and may mean that in a broad sense, the two systems are connected over a wired/wireless communication network and send or receive a variety of pieces of information and/or data in order to implement the technical spirit of the present invention.

Meanwhile, the order relay system 300 may be a system which relays a delivery order, requested by the user terminal 400 connected to the order relay system 300 over a data communication network, a delivery business establishment corresponding to the delivery order. The data communication network may mean a network capable of transmitting packet data and may be the Internet, for example. A variety of types of devices and systems connected to the data communication network may perform the TCP/IP, UDP, socket communication, etc.

For a delivery order over the data communication network, a specific order application may have been installed on the user terminal 400. The order application displays orderable business establishments and orderable items provided by each of the business establishments. When a user selects a business establishment (e.g., 500) and a menu and orders the menu, the order application may transmit order information, including the selected business establishment information and the selected menu information, to the order relay system 300 over the data communication network. Accordingly, the order relay system 300 may transfer (relay) the order information to the terminal (e.g., 520) of the business establishment corresponding to the business establishment information included in the order information. In this case, the order relay system 300 and the terminal (e.g., 500) of the business establishment may also be connected over the data communication network.

Furthermore, the order application may also perform a function for enabling a settlement cost for an order through the order application to be paid to the order relay system 300. In this case, the order application may display the price of each of ordered articles which may be selected by a user. When the user requests a delivery order, the order application may receive settlement information from the user and enable a price for the delivery order to be paid to the order relay system 300 using the received settlement information.

An order method through an order application, such as that described above, is a method different from an order method through a telephone call and is hereinafter defined as an "App order" method. That is, the "App order" method may mean a method of a form in which a user selects an ordered article through an order application installed on his or her user terminal, sends order information for ordering the selected article to an order relay system over a data communication network, and pays a price for the ordered article through the order application.

The order relay system 300 may count the price data of ordered articles, requested through delivery orders relayed to a corresponding business establishment through the App order method, for each business establishment, and may calculate an average price of delivery articles delivered by a corresponding business establishment for each business establishment based on counted data. That is, the order application transmits information about a business establishment and information about an ordered article to the order relay system 300 whenever each order is placed. Accordingly, the order relay system 300 may count the price data of ordered articles, delivered by each business establishment, based on the order of an App method by analyzing the data transmitted by the order application. Furthermore, the order relay system 300 may calculate an average price of delivery articles delivered by a corresponding business establishment by dividing price data, counted for a specific period (e.g., a month or a quarter), by the number of orders received by the corresponding business establishment or the number of delivery articles for the specific period.

Meanwhile, a representative example of a relay method over a data communication network has been described in Korean Patent Application No. 10-2014-0074930 "Delivery order relaying system and providing method thereof" (hereinafter referred to as a "prior application) filed by the present applicant. Contents described in the prior application are included as the reference of the present invention and may be treated as being written in this specification.

Meanwhile, the user terminal 400 may include a desktop and a laptop, and may be a mobile device including a portable phone, a smart phone, a table PC and a personal digital assistant (PDA), a wireless computing device including a handheld device having another radio access function, or a processing device connected to another wireless modem.

The business establishment terminal 520 may also include a desktop and a laptop, and may be a mobile device including a portable phone, a smart phone, a table PC and a personal digital assistant (PDA), a wireless computing device including a handheld device having another radio access function, or a processing device connected to another wireless modem. In some embodiments, the business establishment terminal 520 may be a form included in a Point of Sale (POS) terminal or a form connected to a POS terminal through a specific interface. In this case, the business establishment terminal 520 may also perform a variety of types of functions and credit card inquiry/settlement function which are necessary to implement the technical spirit of the present invention.

Meanwhile, FIG. 2 shows only a single user terminal 400 and a single business establishment 500, for convenience of description, but a person having ordinary skill in the art to which the present invention pertains may easily understand that the telephone relay system 200 and/or the order relay system 300 may relay a plurality of user terminals and a plurality of business establishments.

Furthermore, FIG. 2 shows an example in which the order call relay billing system 100 has been implemented as a separate system separated from the telephone relay system 200 and the order relay system 300. In some embodiments, however, some or all of the elements of the order call relay billing system 100 may be implemented in such a way as to be included in the telephone relay system 200 or the order relay system 300. Furthermore, unlike in FIG. 2, the telephone relay system 200 and the order relay system 300 may be implemented as a single system connected to a telephone network and a data communication network.

Figure 3:
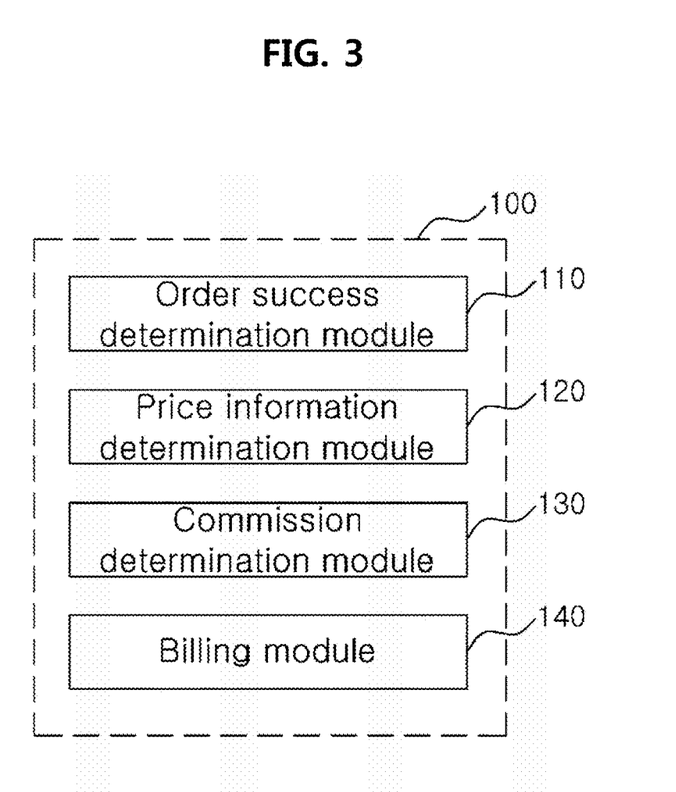
FIG. 3 is a block diagram showing a schematic configuration of the order call relay billing system 100 according to an embodiment of the present invention.

FIG. 3 is a block diagram showing a schematic configuration of the order call relay billing system 100 according to an embodiment of the present invention.

Referring to FIG. 3, the order call relay billing system 100 may include an order success determination module 110, a price information determination module 120, a commission determination module 130 and a billing module 140. In some embodiments of the present invention, some of the elements of FIG. 3 may not correspond to elements that are essentially necessary to implement the present invention. Furthermore, in some embodiments, the order call relay billing system 100 may include a larger number of elements than the elements of FIG. 3. For example, the order call relay billing system 100 may further include a control module (not shown) capable of controlling the functions and/or resources of other elements (e.g., the order success determination module 110, the price information determination module 120, the commission determination module 130 and/or the billing module 140) included in the order call relay billing system 100.

The order call relay billing system 100 may include hardware resources and/or software necessary to implement the technical spirit of the present invention, but does not mean a single physical element or a single device. That is, the order call relay billing system 100 may mean a logical combination of hardware and/or software provided in order to implement the technical spirit of the present invention, and may be implemented as a set of logical elements which are installed on separated devices, if necessary, and which perform respective functions to implement the technical spirit of the present invention. Furthermore, the order call relay billing system 100 may mean a set of elements implemented according to respective functions or roles for implementing the technical spirit of the present invention. For example, the order success determination module 110, the price information determination module 120, the commission determination module 130 and/or the billing module 140 may be located at different physical devices or may be located at the same physical device. Furthermore, in some implementation examples, detailed elements that form each of the order success determination module 110, the price information determination module 120, the commission determination module 130 and/or the billing module 140 may be located at different physical devices. The detailed elements located at the different physical devices may be organically combined to realize the function performed by each of the modules.

Furthermore, in this specification, the module may mean a functional, structural combination of hardware for performing the technical spirit of the present invention and software for driving the hardware. For example, the module may mean a logical unit of specific code and hardware resources in which the specific code is performed, and those skilled in the art may easily reason that the module does not essentially mean physically connected code or one kind of hardware.

Referring to FIG. 3, when the user terminal 400 connects a telephone call to the target business establishment 500, the order success determination module 110 may determine whether the receipt of a telephone order through the telephone call has been successful. In this case, what the receipt of the telephone order has been successful may mean that a verbal order contract (i.e., a contract on which a business establishment delivers an ordered article to a user and the user pays the price for the ordered article to the business establishment) has been concluded between the user and the business establishment through the telephone call. Accordingly, if the order requested by the user through the telephone call has been denied due to a specific reason for refusal (e.g., the exhaustion of material) although the telephone call has been successfully connected, the receipt of the telephone order may be considered to have failed. Meanwhile, in this specification, terms "call attempt" and "call connection" different from the "receipt of the telephone order" may be used. The "call attempt" may mean that the user terminal makes a phone call to a specific telephone number. The "call connection" may mean that after a call to a reception-side telephone is attempted, the reception-side telephone accepts the call and is connected to the telephone call.

In one embodiment, the order success determination module 110 may determine whether the receipt of the telephone order through the telephone call has been successful through voice recognition. For example, the order success determination module 110 may obtain voice communication contents by hooking the telephone call connected between the user terminal 400 and the telephone 520 of the target business establishment 500, and may perform voice recognition on the obtained voice communication contents. If a specific expression is included in the voice-recognized contents, the order success determination module 110 may determine the receipt of the telephone order has been successful.

Alternatively, the business establishment 500 that has successfully received the telephone order from the user terminal 400 may send a specific success signal to the order call relay system 100. The order success determination module 110 may determine that the receipt of the telephone order corresponding to the success signal has been successful.

Meanwhile, in the case of the aforementioned embodiments, there may be a problem in that complicated and expensive equipment, such as a voice recognition system, is required or a business establishment has successfully received a telephone order, but does not send a success signal in order not to pay a corresponding relay commission. Accordingly, in accordance with another embodiment of the present invention, although complicated equipment, such as a voice recognition system, is not provided and there is no feedback (response) from a business establishment, whether a telephone order through a telephone call has been successfully received can be predicted/determined. To this end, the order success determination module 110 according to an embodiment of the present invention may measure the period of the call of the telephone call. If the period of the call of the telephone call is a specific reference period (e.g., 1 minute) or more, the order success determination module 110 may determine that the receipt of the telephone order through the telephone call has been successful. The period of the call of the telephone call may be determined by the telephone relay system 200 or the order call relay system 100. In the former case, the order success determination module 110 may receive a telephone call period determined and transmitted by the telephone relay system, and may determine whether the received telephone call period is a reference period or more. In the latter case, the telephone relay system may determine the start time and end time of a telephone call and send the determined start time and end time of the telephone call to the order call relay system 100. Accordingly, the order success determination module 110 may determine the period between the end time and the start time to be a telephone call period. In some implementation examples, the telephone relay system 200 may determine whether the period of the call of the telephone call is the reference period or more, and may send a result of the determination to the order call relay system 100. The order success determination module 110 may use the result of the determination transmitted by the telephone relay system 200 without any change.

In some implementation examples, the telephone call is a relay call relayed by the order call relay billing system 100 or the telephone relay system 200 operating in conjunction with the order call relay billing system as described above. If the period of the call of the relay call is the reference period or more, the order success determination module 110 may determine that the receipt of the telephone order through the telephone call has been successful. That is, the relay system 200 capable of relaying a telephone connection can easily check the duration of a telephone call according to the relayed telephone connection. Accordingly, there is an advantage in that whether the receipt of the telephone order through the telephone call has been successful can be easily predicted even without complicated additional equipment.

Meanwhile, the telephone relay system 200 may provide information about an order call (a telephone call between the user terminal 400 and the business establishment 500) to the order call relay system 100 while relaying the telephone call between the user terminal 400 and the business establishment 500.

Meanwhile, the billing module 140 may charge a relay commission on the telephone order for the target business establishment 500. In some embodiments, if the order success determination module 110 has determined that the receipt of the telephone order has been successful, the target business establishment 500 may charge a relay commission on the telephone order.

The billing module 140 may measure the number of order telephone calls relayed to the business establishment 500 or the number of successfully received orders for a specific period and set a relay commission based on the number, but may differently set a relay commission depending on the price of an ordered article requested by a user through a telephone order. To this end, the price information determination module 120 may determine information about the price of the ordered article requested through the telephone order, and the commission determination module 130 may determine the relay commission for the telephone order based on the information about the price of the ordered article.

In one embodiment, the price information determination module 120 may determine payment price information, transmitted by the user terminal 400, to be information about the price of the ordered article. In this case, the user terminal 400 may obtain the payment price information through an order application installed on the user terminal 400, and may transmit the obtained payment price information to the order call relay billing system.

The order application may be an application which enables a user to select a delivery business establishment and at least one delivery article provided by the delivery business establishment and to attempt a telephone call connection to the delivery business establishment.

Figure 4A:
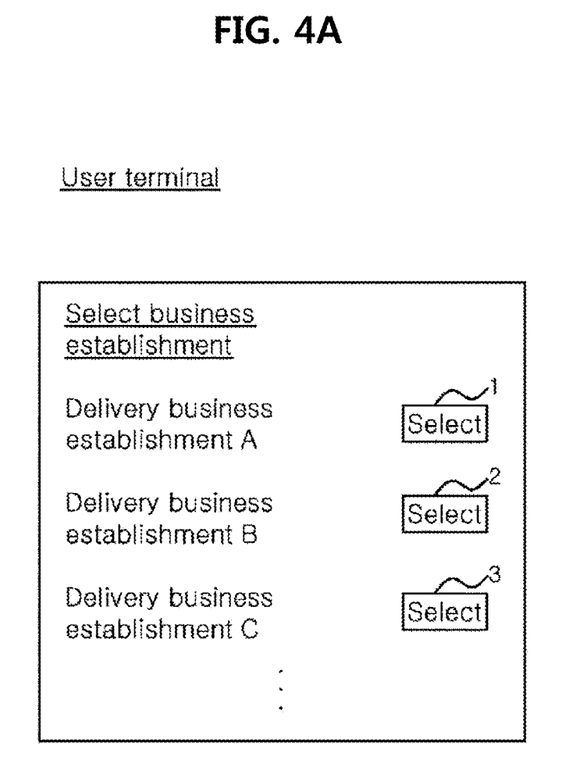
FIGS. 4A and 4B show example of an order UI provided by an order application.
Figure 4B:
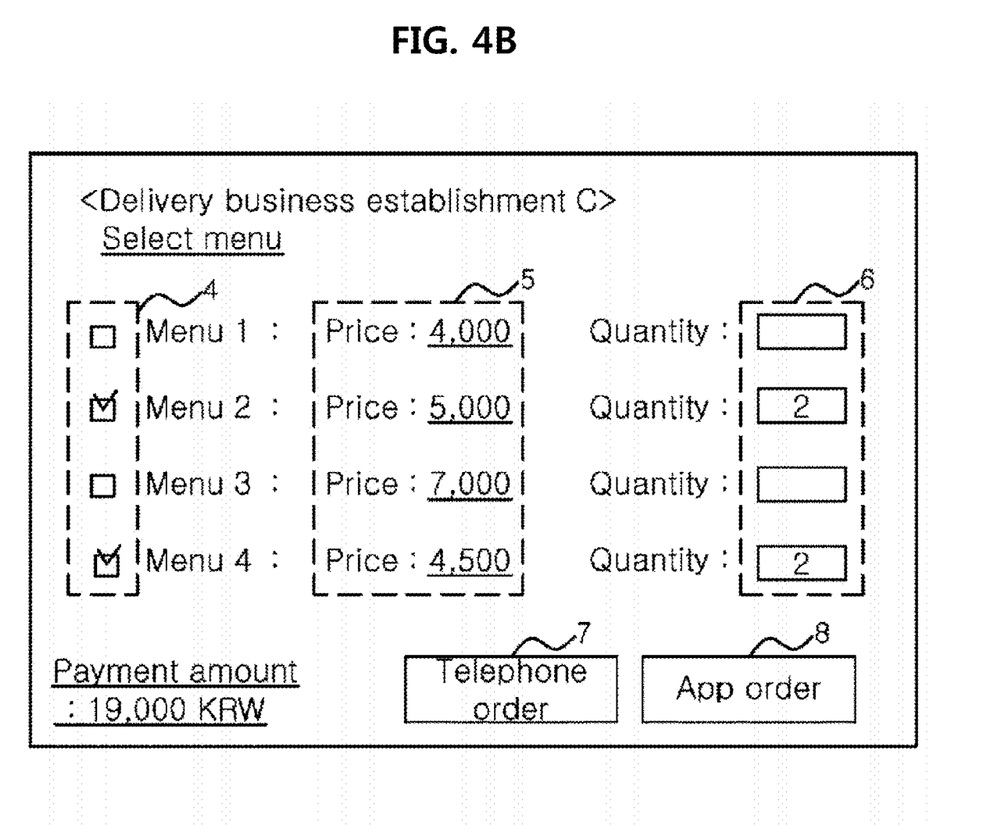

FIGS. 4A and 4B show an order UI provided by the order application. As shown in FIG. 4A, the order application may display business establishment selection UIs 1 to 3 in each of which one of a plurality of delivery business establishments may be selected. A user may select any one of the business establishment selection UIs 1 to 3.

When the user selects the UI 3 for selecting a delivery business establishment C, the order application may display a list of menus (i.e., orderable items) provided by the delivery business establishment C as shown in FIG. 4B. The items of each of the menus may provide a UI 4 for selecting a corresponding menu, the price 5 of each menu and a UI 6 for inputting the quantity.

Information about the price of each of the orderable delivery articles shown in FIG. 4B may be information which has been previously set in the order application or which is received by the order application from the order relay system 300.

If the user wants to order two menus 2 and two menus 4, the order application may calculate the sum (19,000 in the example of FIG. 4B) of the prices of the items selected by the user. The user terminal 400 may obtain the sum of the prices of the items calculated by the order application as payment price information about the telephone order. Meanwhile, as shown in FIG. 4B, the order application may further provide a UI 7 for a telephone order. When the user selects the UI 7 for a telephone order, the order application may attempt a telephone connection with the delivery business establishment C. The user terminal 400 may transmit 19,000, that is, the sum of the prices of the items calculated by the order application, to the order call relay system 100 as payment price information.

The order application may be an application which is used in an App order, such as that described above, and may be an application which provides both an App order and telephone order for each orderable delivery article. In this case, the order application may further provide a UI 8 for an App order as shown in FIG. 4(b). When the user selects the UI 8 for an App order, the order application may request a delivery order from the order relay system 300 operating in conjunction with the order call relay billing system 100 over the data communication network, and may enable 19,000, that is, the price of the delivery order, to be paid to the order relay system 300.

Meanwhile, in another embodiment, the price information determination module 120 may obtain information about an average price of delivery articles, delivered by the target business establishment, from the order relay system 300 operating in conjunction with the order call relay billing system 100, and may determine (or predict) information about the price of the ordered articles requested through the telephone order based on the obtained information about the average price of the items provided by the target business establishment. That is, in the case of an App order, the price of an ordered article requested through each order can be clearly known due to the nature of the App order. In the present embodiment, the price of an ordered article through a telephone order by which the price of an ordered article is difficult to be clearly known can be predicted based on the price of an ordered article through an App order by which the price of an ordered article can be clearly known. Such an embodiment is described below with reference to FIGS. 5a and 5b.

Figure 5A:
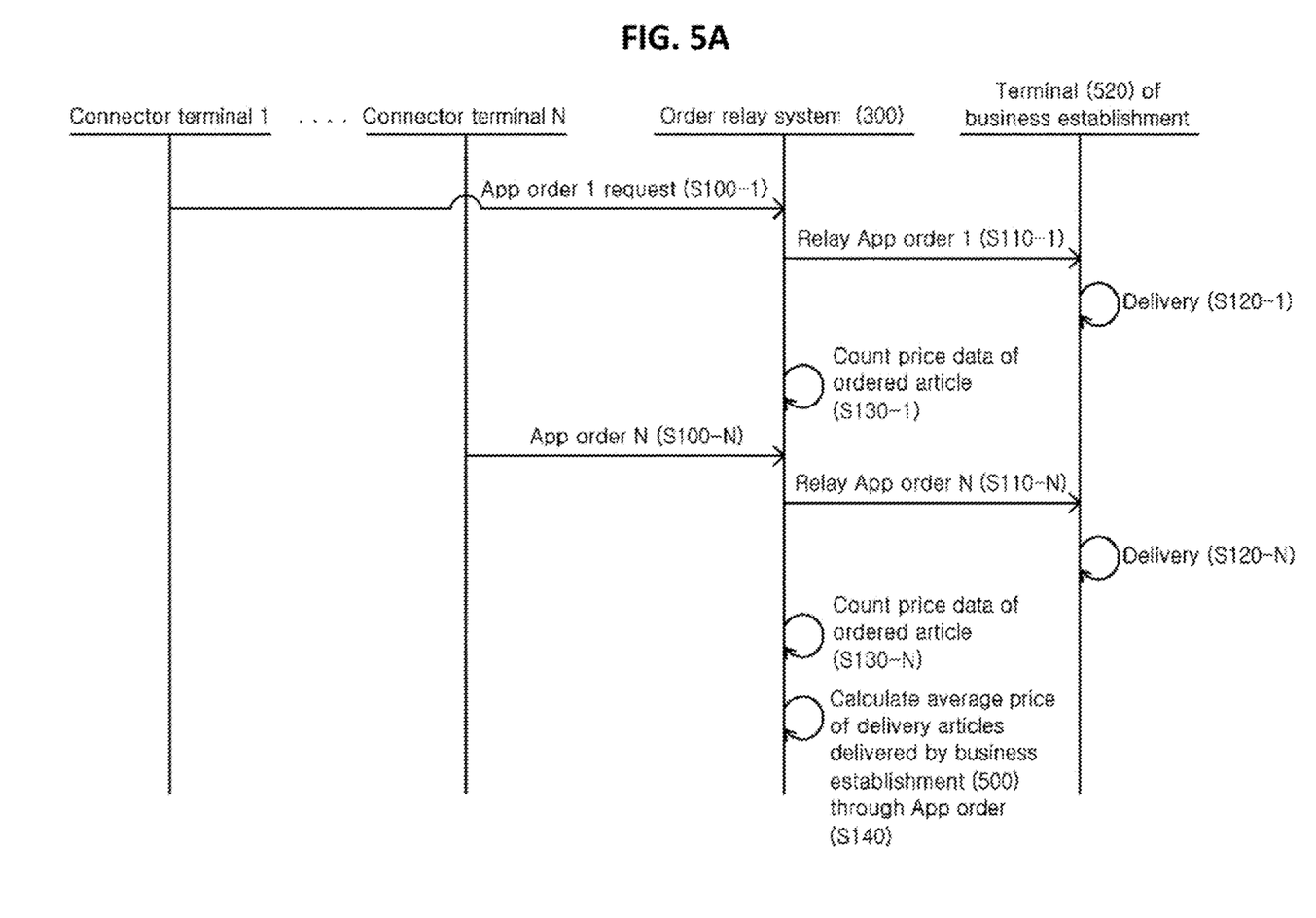
FIG. 5A is a diagram showing a process of calculating, by an order relay system according to an embodiment of the present invention, information about an average price of delivery articles delivered by a target business establishment through an App order.
Figure 5B:
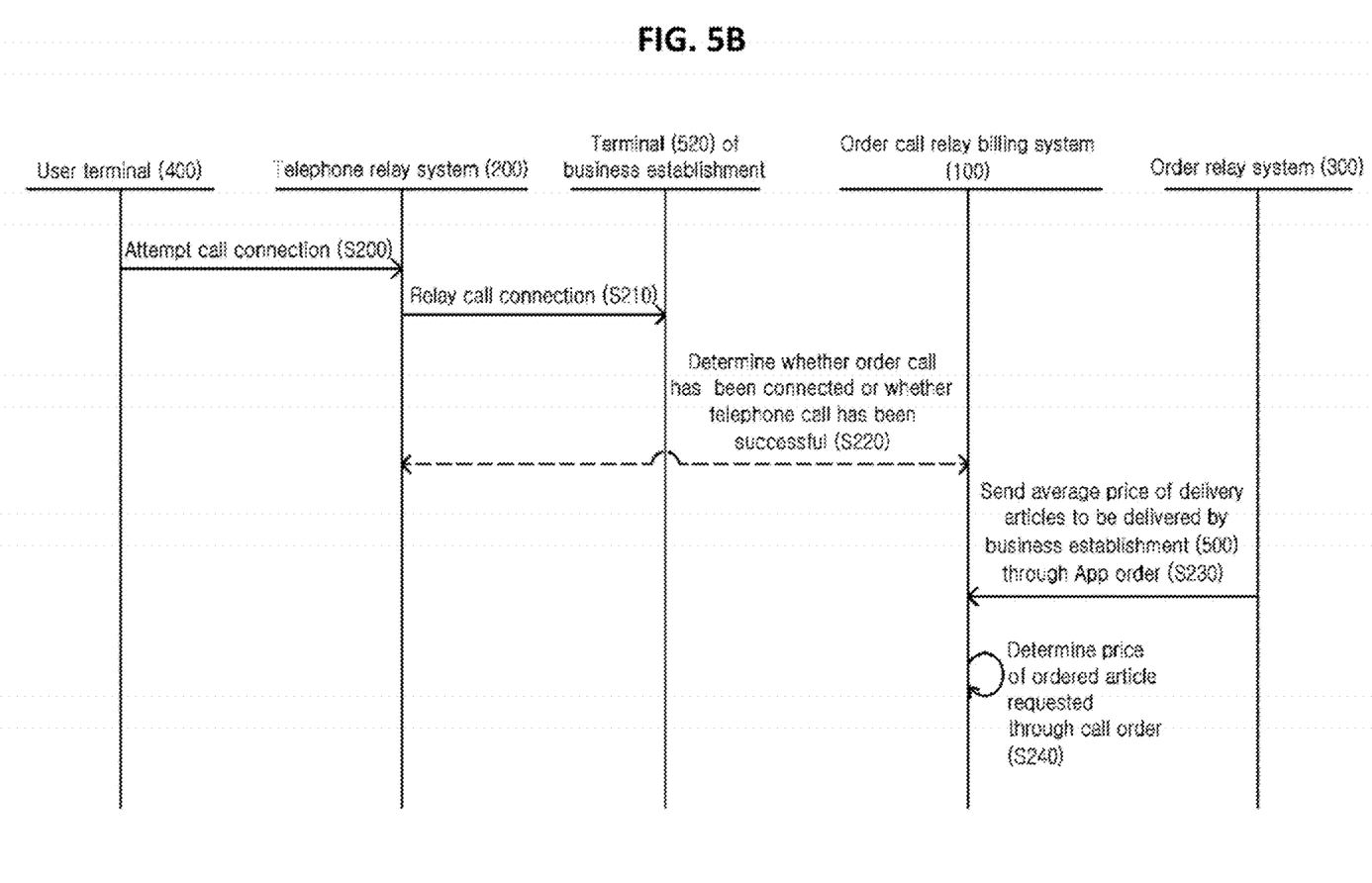
FIG. 5B is a diagram showing a process of determining, by the order call relay system according to an embodiment of the present invention, information about the price of an ordered article requested through a telephone order when the telephone order is generated.

FIG. 5a is a diagram showing a process of calculating, by the order relay system 300, information about an average price of delivery articles delivered by a target business establishment through an App order. FIG. 5b is a diagram showing a process of determining information about the price of an ordered article requested through the telephone order when the telephone order is generated.

First, referring to FIG. 5a, a connector terminal 1 to a connector terminal N which have accessed the order relay system 300 for an App order may request an App order 1 to an App order N, respectively, from the target business establishment 500 (S100-1 to S100-N). In response to the requests, the order relay system may relay the requested App orders to the business establishment terminal 520 of the target business establishment 500 whenever the App orders are requested (S110-1 to S110-N). Accordingly, the target business establishment 500 may receive the App orders and deliver delivery articles (S120-1 to 120-N). Furthermore, whenever the App orders are requested, the order relay system 300 may count the prices of ordered articles to be ordered by the connectors through the corresponding App orders (S130-1 to 130-N).

Meanwhile, the order relay system 300 may calculate information about an average price of delivery articles delivered by the target business establishment 500 based on the price data of ordered articles counted for a specific period (S140). For example, the order relay system 300 may calculate an average price of delivery articles to be delivered by the target business establishment 500 through an App order by dividing the total price of ordered articles counted for a specific period by the number of items or the number of App orders.

Referring to FIG. 5*b*, when the user terminal 400 attempts a telephone call to the business establishment telephone for a telephone order (S200), the telephone relay system 200 may relay the telephone call (S210), so the telephone call is connected between the user terminal 400 and the business establishment telephone 520.

Meanwhile, the order call relay system 100 may determine whether a telephone call for a telephone order has been connected between the user terminal 200 and the business establishment 500 or whether the receipt of the telephone order has been successful through the telephone relay system 200 (S220). In order to determine information about the price of an ordered article requested through the telephone order, the order call relay system 100 may receive information about an average price of delivery articles to be delivered by the target business establishment 500 through an App order, which has been calculated by the order relay system 300 In FIG. 5*a* (S230). Thereafter, the price information determination module 120 may determine the received average price of the delivery articles, delivered by the target business establishment 500 through the App order, to be the price of the ordered articles requested through the telephone order (S240).

As described above, the order call relay system 100 according to an embodiment of the present invention can provide a technical spirit in which even in the case of a telephone order the contents of which are difficult to check, whether the receipt of a telephone order has been successful or not and/or the price of an ordered article requested through a telephone order can be predicted and a relay commission can be calculated based on the prediction of whether the receipt of the telephone order has been successful or not and/or the predicted price. Accordingly, there is an advantage in that illogicalness felt by a business establishment if a relay commission is one-sidely set by not taking into consideration whether a telephone order is successful or not or the price of an ordered article can be reduced.

Meanwhile, whether the receipt of a telephone order has been successful or not and/or the price of an ordered article requested through a telephone order, which has been determined by a method such as that described above, may be a little inaccurate because it is predicted based on reference data. Accordingly, an embodiment of the present invention can provide a technical spirit in which illogicalness which may be felt by a business establishment when a relay commission is levied based on inaccurate prediction data can be reduced by applying a discount rate to a set relay commission. To this end, the billing module 140 may actually charge only part of a relay commission for a target business establishment during the term, which has been set by the aforementioned method.

In one embodiment, the billing module may charge a relay commission on only part of a telephone order relayed during the term. Furthermore, in some embodiments, if it is determined that the receipt of a telephone order through a telephone call has been successful, the billing module 140 may add a relay commission for the telephone order to the amount asked during the term to be asked with respect to a target business establishment during the term, and may calculate the final amount asked during the term by applying a specific discount rate to the amount asked during the term.

Meanwhile, in some implementation examples, the order call relay billing system 100 may include a processor and memory for storing a program executed by the processor. The processor may include a single core CPU or a multi-core CPU. The memory may include high-speed random access memory, and may include one or more magnetic disk storage devices, flash memory devices or non-volatile memory, such as other non-volatile solid state memory devices. Access to the memory by the processor and other elements may be controlled by a memory controller. In this case, when the program is executed by the processor, it may enable the order call relay billing system 100 according to the present embodiment to perform the method for providing the delivery order relay system.

The illustrative logical blocks and modules described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

Meanwhile, the method for providing the delivery order relay system according to an embodiment of the present invention may be implemented in the form of computer-readable program code and may be stored in a computer-readable recording medium. The computer-readable recording medium includes all of kinds of recording devices in which data readable by a computer system is stored.

The program code recorded on the recording medium may have been specifically designed and configured for the present invention or may have been known to and may be used by those skilled in the software field.

Examples of the computer-readable recording medium include magnetic media such as a hard disk, a floppy disk and a magnetic tape, optical media such as CD-ROM and a DVD, magneto-optical media such as a floptical disk, ROM, RAM, and flash memory, and hardware devices specially configured to store and execute program code. Furthermore, the aforementioned medium may be a transmission medium, such as light including a carrier for sending a signal that designates program code, a data structure, etc., a metal line or a waveguide. Furthermore, the computer-readable recording medium may be distributed to computer systems connected over a network, and the computer-readable code may be stored and executed in a distributed manner.

An example of the program code includes not only machine code, such as that produced by a compiler, but also high-level language code executable by a device for electronically processing information using an interpreter, for example, a computer.

The aforementioned hardware device may be configured to operate as one or more software modules in order to perform the operation of the present invention, and vice versa.

The aforementioned description is illustrative, and those skilled in the art to which the present invention pertains will understand that the present invention may be implemented in other detailed forms without departing from the technological spirit or essential characteristics of the present invention.

Accordingly, the aforementioned embodiments should be construed as being only illustrative not as being restrictive from all aspects. For example, each of the elements described in the singular form may be distributed and implemented. Likewise, the elements that have been illustrated as being distributed may also be implemented in a combined form.

The range of right of the present invention is defined by the appended claims rather than the detailed description, and the present invention should be construed as covering all modifications or variations derived from the meaning and scope of the appended claims and their equivalents.

What is claimed is:

1. A system for relaying online purchase orders to a store and relaying telephone calls to the store, the system comprising:
    at least one processor; and
    at least one memory storing computer-executable instructions, the computer-executable instructions configured to cause the system to:
        in response to an online purchase request transmitted from a user terminal, generate and transmit an online purchase order to the store's computing terminal over a data communication network;
        store data of the online purchase order in a data store which further stores data of other online purchase orders made to the store over the data communication network;
        compute, using the data stored in the data store, an average amount of online purchase orders made for a given period of time to the store's computing terminal;
        in response to a telephone connection request from a user telephone, cause to establish a telephone connection between the user telephone and a store telephone of the store such that a telephonic conversation is to be made through the telephone connection between the user telephone and the store telephone, wherein the telephone connection request comprises a virtual telephone number of the store telephone;
        subsequent to establishing the telephone connection, determine whether the telephone connection has lasted longer than a predetermined period; and
        charge to the store a referral commission for the telephone connection if it is determined that telephone connection has lasted longer than the predetermined period, wherein no referral commission is charged to the store if it is determined that the telephone connection has not lasted longer than the predetermined period,
    wherein the referral commission for the telephone connection is determined based on the average amount of the online purchase orders,
    wherein the computer-executable instructions are configured to cause the system to locate an actual telephone number of the store telephone based on a mapping between the actual telephone number and the virtual telephone number.

2. The system of claim 1, wherein the online purchase orders comprises a mobile order placed using a mobile application installed on a mobile terminal, wherein the mobile order is placed to the store's computing terminal other than the store telephone.

3. A method of relaying online purchase orders to a store and relaying telephone calls to the store,
    wherein the method is performed by a computing system having at least one processor and at least one memory storing computer-executable instructions,
    wherein the method comprises:
        in response to an online purchase request transmitted from a user terminal, generating and transmitting an online purchase order to the store's computing terminal over a data communication network;
        storing data of the online purchase order in a data store which further stores data of other online purchase orders made to the store over the data communication network;
        computing, using the data stored in the data store, an average amount of online purchase orders made for a given period of time to the store's computing terminal;
        in response to a telephone connection request from a user telephone, causing to establish a telephone connection between the user telephone and a store telephone of the store such that a telephonic conversation is to be made through the telephone connection between the user telephone and the store telephone, wherein the telephone connection request comprises a virtual telephone number of the store telephone;
        subsequent to establishing the telephone connection, determining whether the telephone connection has lasted longer than a predetermined period; and
        charging to the store a referral commission for the telephone connection if it is determined that telephone connection has lasted longer than the predetermined period, wherein no referral commission is charged to the store if it is determined that the telephone connection has not lasted longer than the predetermined period,
    wherein the referral commission for the telephone connection is determined based on the average amount of the online purchase orders,
    wherein the computer-executable instructions are configured to cause the system to locate an actual telephone number of the store telephone based on a mapping between the actual telephone number and the virtual telephone number.

4. The method of claim 3, wherein the online purchase orders comprises a mobile order placed using a mobile application installed on a mobile terminal, wherein the mobile order is placed to the store's computing terminal other than the store telephone.

5. A non-transitory computer-readable recording medium storing a computer-executable program, the computer-executable program configured to cause a computing system to perform the method according to claim 3.

* * * * *